United States Patent
Forbes et al.

[11] Patent Number: 6,051,141
[45] Date of Patent: Apr. 18, 2000

[54] WATER TREATMENT

[75] Inventors: Neil Robert Forbes; Thomas Richard Jones, both of Cornwall, United Kingdom

[73] Assignee: Imerys Minerals Limited, United Kingdom

[21] Appl. No.: 09/018,876

[22] Filed: Feb. 5, 1998

[30] Foreign Application Priority Data

Feb. 13, 1997 [GB] United Kingdom ............... 9702964

[51] Int. Cl.$^7$ ...................................... C02F 5/08
[52] U.S. Cl. ................ 210/667; 210/679; 210/696; 252/175
[58] Field of Search ................... 210/696, 679, 210/667; 252/180, 175; 261/DIG. 11

[56] References Cited

U.S. PATENT DOCUMENTS

| | | | |
|---|---|---|---|
| 2,313,194 | 3/1943 | Fiedler et al. ............... | 210/33 |
| 3,887,462 | 6/1975 | Lagess et al. ............... | 210/53 |
| 4,168,230 | 9/1979 | Farley ........................ | 210/58 |
| 4,216,086 | 8/1980 | Lang .......................... | 210/47 |
| 4,276,180 | 6/1981 | Matson ....................... | 210/683 |
| 4,462,905 | 7/1984 | Axtmann ..................... | 210/189 |
| 5,512,181 | 4/1996 | Matchett ..................... | 210/644 |

FOREIGN PATENT DOCUMENTS

| | | |
|---|---|---|
| 1003803 | 3/1952 | France . |
| 55-084588 | 6/1980 | Japan . |
| 9300644 | 11/1993 | South Africa . |
| 2235440 | 6/1991 | United Kingdom . |
| WO92/21618 | 12/1992 | WIPO . |

*Primary Examiner*—David A. Simmons
*Assistant Examiner*—Frank M. Lawrence
*Attorney, Agent, or Firm*—Suzanne Kikel

[57] ABSTRACT

A method of treating water containing silicon-containing impurities in a concentration of up to 10,000 parts per million by weight of the water, by contacting the water over a period of time with a particulate solid which entrains silicon-containing impurities in the water and subsequently separating the water from the particulate solid, wherein the particulate solid is a high alumina cement which is anhydrous when first contacted by the water.

13 Claims, 3 Drawing Sheets

WATER TREATMENT

BACKGROUND OF THE INVENTION

1. Field of the Invention

The present invention relates to a process for removing silicon-containing impurities from water especially industrial water.

Water is commonly used in industrial systems, eg heating or cooling systems. Silica is present in water obtained from natural sources, and is therefore present in industrial water. If the concentration of silica exceeds a threshold value which depends upon the conditions, but is often around 150 $mgl^{-1}$, precipitation occurs, and fouling of surfaces by scale can take place. Formation of scale reduces efficiency of, for example, heat exchangers, it impedes flow, and it is costly and difficult to remove.

Scale formation on surfaces in cooling waters can arise in systems where pure water is lost by evaporation (for example, in cooling towers), and is replaced from another source (known as make up water). To reduce the consumption of water, the water is recirculated around the cooling system, and, ideally, the only water added is to replace that lost as steam from cooling towers. The concentration of silica in the water lost is low relative to that in the make up water, so the concentration of silica increases in the circulating water, eventually to the point at which precipitation and scaling occur. To prevent this, some water is removed from the circulation system (blow down) and is replaced by augmenting the make up water.

Any increased requirement in make up water is undesirable in terms of cost and, particularly in arid areas, availability. Alternative methods of preventing scale formation are desirable to lessen the need for increased make up.

Scale inhibiting chemical treatments are used to allow some minerals, such as calcium carbonate, to be present in solution at increased concentrations, but similar treatments for silica are comparatively ineffective. In addition, the discharge of chemicals into the environment is becoming increasingly undesirable. An alternative method of scale prevention is the removal of the impurities from the water so as to reduce the concentration. Examples of these prior art processes are as follows.

2. Description of the Prior Art

One known process for removing silicon-containing, and other, impurities from industrial water is the lime-soda softening process. This is described by F DeSilva in Chemical Engineering, August 1996, as being a sidestream process whereby scale forming ions are removed from cooling water systems. A portion of the recirculating water is treated with lime or caustic, soda ash and magnesium oxide to precipitate respectively carbonate hardness, non-carbonate hardness, and silica. The sludge formed may be dewatered.

Evaporation may also be used for reducing the concentration of scale forming minerals. A vapour-compression process, as described by B P Boffardi and A L Smith, Chemical Engineering, July 1995, is used to return purified water to the system. However, the nature of the evaporation process renders the equipment susceptible to scaling and fouling, and so maintenance costs are high.

Colloidal alumina may be used to adsorb silica from blow down water, as stated in U.S. Pat. No. 5,512,181. Dialysing the blow down produces a permeate with a reduced silica content.

Chemical treatments are used to increase the concentrations of scale forming minerals which may be present without deposition occurring. The minerals commonly treated include calcium carbonate, calcium sulphate, calcium phosphate and silica. Effective treatments for calcium salts exist. Calcium carbonate may be controlled by the use of polyphosphates, phosphonates and some polymers (eg polyacrylates, as described in U.S. Pat. No. 4,168,230). Calcium sulphate may be controlled with phosphates and aminomethylene-based polymers. Calcium phosphate may be controlled using certain polymers. Chemical treatments for the prevention of silica scale exist, for example polymaleic acid polymer, and carboxylate-sulphonate polymers (W M Hann, S T Robertson, J H Bardsley, $54^{th}$ International Water Conference, Pittsburgh, Pa., Oct. 11–13, 1993), but are less effective than those for calcium salts.

Prior art references GB-A-2,235,440 and U.S. Pat. No. 3,887,462 describe the use of solid agents including Portland cement to treat waste containing waters. These references do not disclose specifically treatment of waters containing colloidal silica.

U.S. Pat. No. 4,462,905 describes the removal of amorphous silica from geothermal waters using solid particles but does not envisage the new method described herein.

SUMMARY OF THE INVENTION

It is an object of the invention to provide a new method for reducing the content of silicon-containing impurities, eg colloidal silica, in an aqueous medium, eg an industrial water system.

According to the present invention there is provided a method for treating water to reduce the concentration of silicon-containing impurities in water contained in the water in a concentration of up to 10,000 parts by weight per million parts by weight (ppm) of the water, wherein the water is contacted over a period of time with an anhydrous high alumina cement which entrains the silicon-containing impurities, the water subsequently being separated with a reduced silicon impurity content from the high alumina cement. Unexpectedly and beneficially an effective removal of the silicon-containing impurities may be made in this way.

DESCRIPTION OF THE INVENTION

In the method according to the invention the water to be treated may be contacted by a bed of particles of the high alumina cement, eg by recirculating the water through the bed, but is preferably treated by mixing particles of the cement in anhydrous form into the water to be treated, eg in a batch treatment vessel, whereby the particles form a suspension. Preferably, such a suspension contains up to 100,000 ppm by weight of the high alumina cement. Such a suspension will eventually settle or equilibrate.

The water is preferably contacted with the high alumina cement in the method according to the invention for at least 10 minutes, preferably at least 15 minutes.

Where a suspension of the high alumina cement in the water is formed, the suspension is preferably allowed to equilibrate over an equilibration period, eg of from 15 minutes to 24 hours. Following such equilibration, the cement particles containing entrained silicon-containing impurities may be separated in a conventional way, preferably by filtration.

The treated water in the method according to the present invention may comprise industrial water which may be, for example, water in an industrial plant or process, cooling water, geothermal waters and/or water used in the manufacture of a product, eg paper, or any other water from which it is required to remove silicon-containing impurities. The concentration of the silicon-containing impurities in the water will typically be in the range of from 60 ppm to 10,000 ppm, especially 100 ppm to 1000 ppm.

High alumina cement is a hydraulic cement of a known class made from aluminous and calcareous raw materials which are fused or sintered and comminuted to a fine powder. The alumina content may be at least 20% in a composition with other oxides, usually at least 30% by weight. The high alumina cement may comprise from 75% to 95% by weight $Al_2O_3$ plus CaO. Preferably the cement comprises particles having a surface area of at least 1000 $m^2.g^{-1}$, preferably at least 2000 $m^2.g^{-1}$ desirably 3000 $cm^2.g^{-1}$ or more. For example, for compliance with British Standard BS915, there is a weight ratio of $Al_2O_3$:CaO of 0.85:1 to 1.3:1, $Al_2O_3$ and CaO forming from 75% to 90% by weight of the composition.

Preferably, the high alumina cement is of the type known as "SECAR 71", or the type known as "ciment fondu". Ciment fondu typically has a chemical composition indicated by the following percentages by weight: $Al_2O_3$ 39.0%, CaO 38.5%, $SiO_2$ 4.5%, $Fe_2O_3$ 12.0% and FeO 4.0%. The particle size distribution is such that the surface area as measured by the Blaine air permeability method has an average value of about 3000 $cm^2.g^{-1}$. "SECAR 71" has a similar chemical composition to ciment fondu, but generally has a somewhat lower content of iron oxides, and is considerably more expensive than ciment fondu.

The amount of the cement used is preferably in the range of from 30 to 100,000 ppm.

In the method according to the present invention the cement is preferably equilibrated with the water for a time of between 30 minutes and 6 hours. The pH of the mixture is preferably maintained at a level between 6 and 10.5, more preferably between 8 and 10, and the temperature is preferably maintained between 20° C. and 80° C.

The method according to the invention is especially advantageous for reducing the concentration in industrial water of silicon-containing impurities of colloidal size, for example particulate impurities having a particle diameter less than 1 µm, eg between 1 nm and 500 nm.

In order for the method of the invention to operate efficiently, it has been found that it is advantageous for there to be present in the water a small quantity, for example 0.05 m.mol per liter of water or above, of an alkali metal cation or an alkaline earth metal cation during the equilibration.

During the period of equilibration of the cement with the water the mixture may be in a quiescent state or, more preferably, may be forced to undergo turbulent motion, eg by mechanical stirring or agitation or by bubbling an inert gas through the mixture.

Embodiments of the present invention will now be described by way of example with reference to the following Examples and to the accompanying drawings in which:

DESCRIPTION OF THE ACCOMPANYING DRAWINGS

DESCRIPTION OF ILLUSTRATIVE EMBODIMENTS OF THE INVENTION

Example 1

Figure 1:
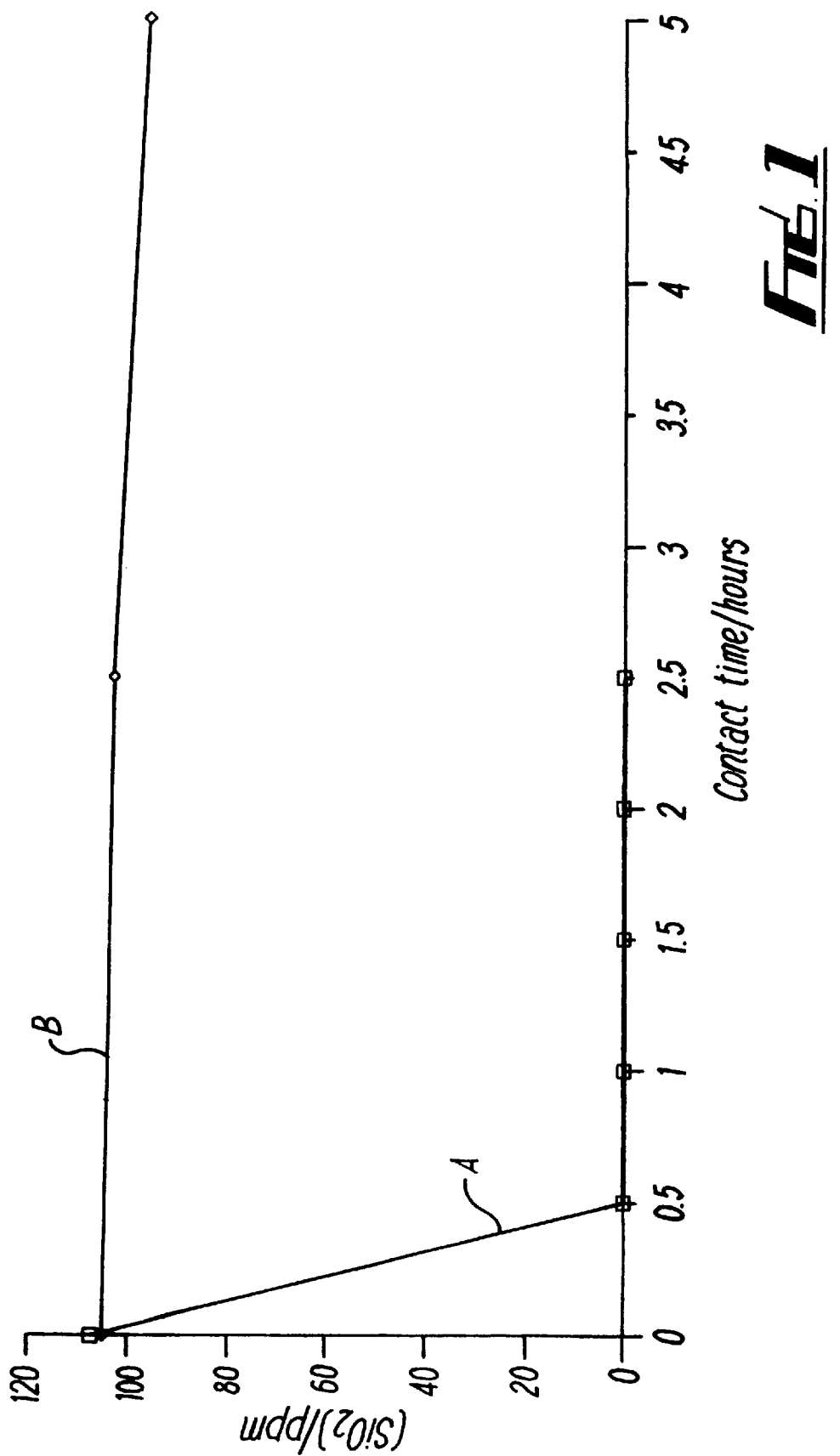
FIG. 1 is a graph of silica content versus contact time for contact of an aqueous silica containing composition with a high alumina cement composition (curve A) and for no cement addition (curve B).

An aqueous suspension of colloidal silica of mean particle diameter of about 12 nm, marketed under the trade name "LUDOX TM40", containing 42.1% by weight of $SiO_2$, and having a pH value of 9, was diluted using distilled water adjusted to pH9 with ammonia until the concentration of colloidal silica was about 100 ppm. This colloidal suspension simulated typical silica-containing water of an industrial water system. 250 g of this colloidal suspension was placed in a 500 ml bottle, and 0.25 g of ciment fondu was added, corresponding to a cement fondu concentration of about 1000 ppm. The bottle was sealed, and the contents stirred at room temperature by means of a magnetic follower. Periodically, aliquots were withdrawn and filtered using Whatman No 50 filter paper, such that the cement particles (including entrained silica) but not the colloidal silica, were retained by the filter. The $SiO_2$ concentration of the filtrate was analysed using inductively coupled plasma atomic emission spectroscopy. The results, and those from a control experiment in which no ciment fondu was added, are illustrated in FIG. 1. FIG. 1 shows that, when 1000 ppm of ciment fondu is mixed with the silica-containing water in accordance with an embodiment of the invention, the concentration of silica in the water is beneficially reduced substantially to zero (curve A) from its original level (curve B) after an equilibration time of ½ hour.

Example 2 (Comparative)

Figure 2:
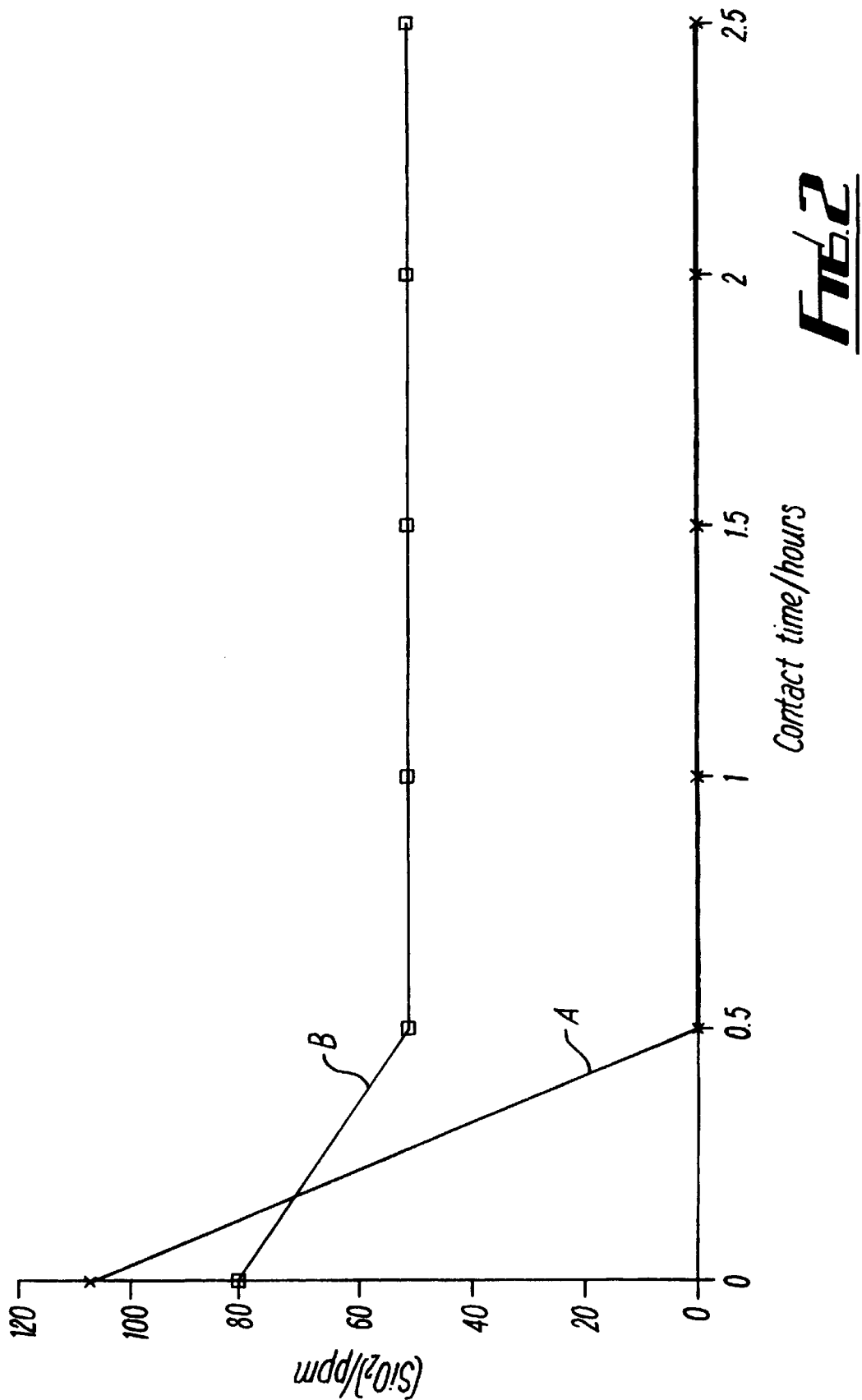
FIG. 2 is a graph of silica content versus contact time for contact of an aqueous silica containing composition with alternative cement compositions, viz high alumina cement (curve A) and Portland cement (curve B).

The procedure given in Example 1 was followed, except that 0.25 g of Portland cement was used instead of the ciment fondu. The results are compared with those for ciment fondu in FIG. 2. FIG. 2 shows that, when the silica-containing water is mixed with Portland cement (curve B), the concentration of silica in the water is reduced from about 80 ppm to about 50 ppm after an equilibration time of ½ hour, but no further reduction in the concentration of silica is observed, even if the equilibration time is increased to 2.5 hours. However, for cement fondu addition in accordance with an embodiment of the invention as described in Example 1 the concentration of silica in the water is reduced to zero after an equilibration time of 0.5 hours. This result is reproduced as curve A in FIG. 2 and shows when compared with curve B that a significant improvement is obtained by use of the method embodying the invention.

Example 3

Figure 3:
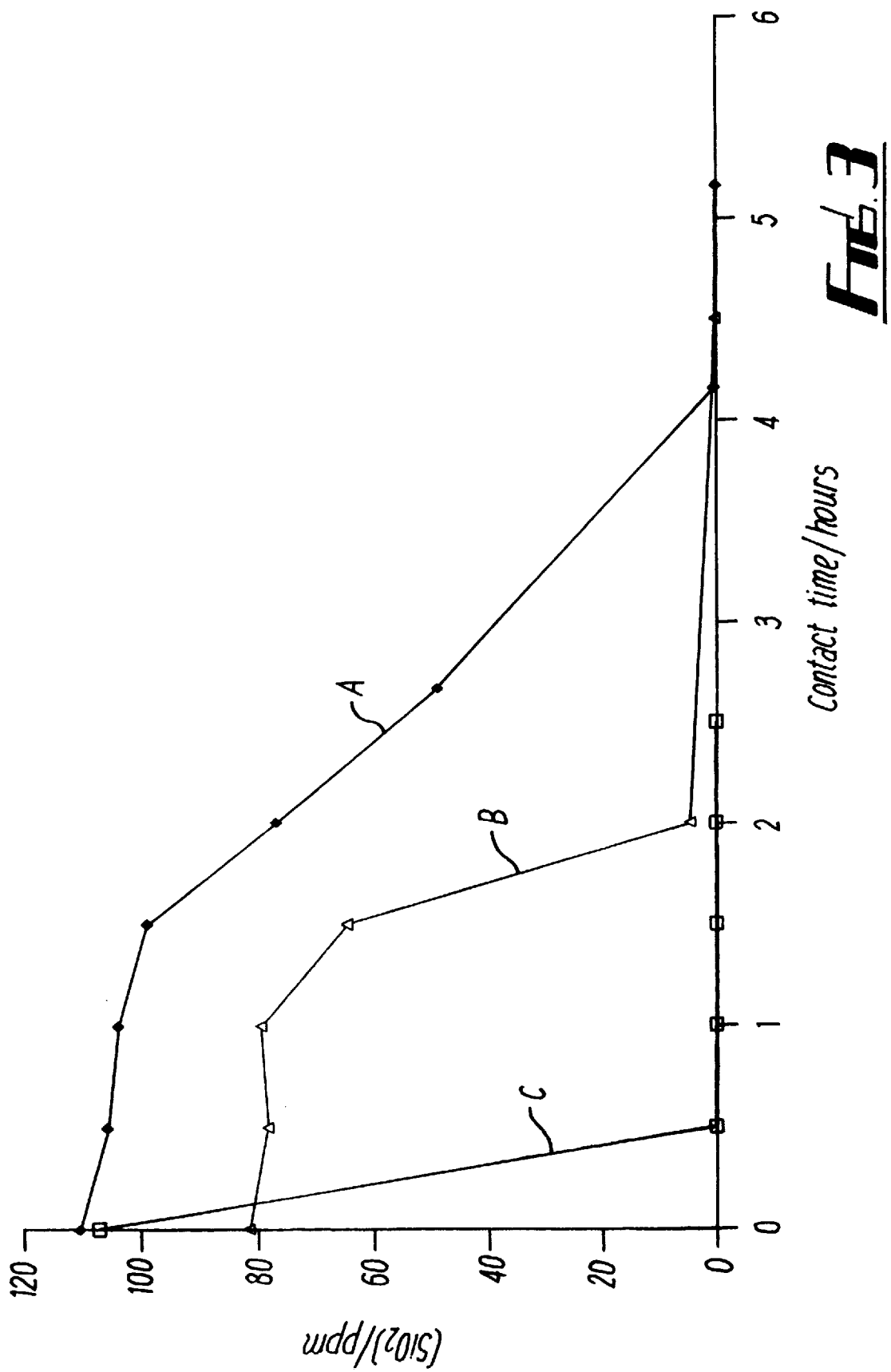
FIG. 3 is a graph of silica content versus contact time for contact of an aqueous silica-containing composition with alternative high alumina cement concentrations (33 ppm–curve A; 100 ppm–curve B and 1000 ppm–curve C).

The procedure given in Example 1 was followed, except that the quantities of ciment fondu used were $8.25 \times 10^{-3}$ g, 0.025 g, and 0.25 g, corresponding to ciment fondu concentrations of about 33, 100, and 1000 ppm respectively. The results obtained are illustrated in FIG. 3. These results show that lower concentrations of the high alumina cement are still effective in reducing the concentration of silica in the filtrate substantially to zero, but the equilibration time required is correspondingly increased. If the concentration of ciment fondu is 100 ppm, the $SiO_2$ concentration is reduced to below 5 ppm after an equilibration time of 2 hours, and if the concentration of ciment fondu is 33 ppm, the $SiO_2$ concentration is reduced substantially to zero after an equilibration time of a little over 4 hours.

Example 4

An aqueous suspension containing 150 ppm of the colloidal silica "LUDOX TM40" and having a pH value of 9 was prepared as described in Example 1. 250 g of this colloidal suspension was placed in a 500 ml polypropylene oxide bottle, and 0.0125 g of ciment fondu was added, corresponding to a ciment fondu concentration of about 50 ppm. The bottle was sealed, and the contents stirred at room temperature by means of a magnetic follower for a time of six hours. The contents of the bottle were then filtered as described in Example 1. The filtrate was diluted by 50 times with water and to 50 g of the diluted solution were added four drops of 98% sulphuric acid and 0.02 g of sodium fluoride. The treated solution was aged overnight at 80° C. in order to digest any colloidal silica present, and analysed using the molybdate method as described by Iler, R K, The Chemistry of Silica, 1979. The absorbence of radiation of wavelength 810 nm was determined, and by comparison with a set of standard solutions, the silica concentration was determined and found to be 4 ppm. The experiment was then repeated except that the contents of the bottle were not stirred, but were left to stand under quiescent conditions for six hours. In this case the $SiO_2$ concentration of the filtrate was found to be 79 ppm. These results demonstrate the advantageous effect of forcing the mixture of cement and silica-containing water to undergo turbulent motion.

Example 5

An aqueous suspension containing 100 ppm of the colloidal silica "LUDOX TM40" and having a pH value of 9 was prepared as described in Example 1. 250 g of this colloidal suspension was placed in a 500 ml polypropylene oxide bottle, and $8.25 \times 10^{-3}$ g of ciment fondu was added, corresponding to a ciment fondu concentration of about 33 ppm. The bottle was sealed, and the contents stirred at room temperature by means of a magnetic follower. Periodically, aliquots were withdrawn and filtered as described in Example 1. The $SiO_2$ concentration of each filtrate was analysed using the method described in Example 4. It was found that the $SiO_2$ concentration in the filtrate was reduced substantially to zero after a contact time of 4 hours.

The experiment was then repeated except that the suspension of ciment fondu and colloidal silica also contained 0.5 mmol of magnesium sulphate per liter of suspension. In this case the concentration of $SiO_2$ in the filtrate was reduced substantially to zero after a time of only 1 hour.

Example 6

An aqueous suspension containing 150 ppm of the colloidal silica "LUDOX TM40" and having a pH value of 9 was prepared as described in Example 1. 250 g of this colloidal suspension was placed in a 500 ml polypropylene oxide bottle, and 0.0125 g of ciment fondu was added, corresponding to a ciment fondu concentration of about 50 ppm. The bottle was sealed, and the contents stirred at 20° C. by means of a magnetic follower. Periodically, aliquots were withdrawn and filtered as described in Example 1. The $SiO_2$ concentration of each filtrate was analysed using the method described in Example 4 above. It was found that the $SiO_2$ concentration in the filtrate was reduced substantially to zero after a contact time of 6 hours.

The experiment was then repeated except that the contents of the bottle were stirred at a constant temperature of 80° C. In this case the concentration of $SiO_2$ in the filtrate was reduced substantially to a value of 4 ppm after a time of 3 hours.

The above Examples illustrate the effectiveness of the method according to the present invention in removing undesirable colloidal silica from an aqueous medium.

We claim:

1. A method of treating water containing silicon-containing impurities comprised of colloidal size particles, said impurities being in a concentration of up to 10,000 parts per million by weight of the water, the steps comprising:

(a) mixing anhydrous high alumina cement with the water to form a suspension;

(b) allowing said high alumina cement to contact the water over a period of time so that said high alumina cement becomes hydrous and the mixture of silicon-containing impurities and the high alumina cement equilibrates in the water and the high alumina cement entrains the silicon-containing impurities in the water; and (c) subsequently separating the water from the high alumina cement with the entrained silicon-containing impurities, wherein the concentration of silicon-containing impurities including the colloidal size particles are substantially reduced in the water.

2. A method of treating water as claimed in claim 1 and which includes the steps of (d) recovering the separated water which is treated.

3. A method as claimed in claim 1 and wherein said separation comprises filtration.

4. A method as claimed in claim 1 and wherein the equilibration takes place over a period of from 15 minutes to 24 hours.

5. A method as claimed in claim 1 and wherein the water to be treated contains from 60 to 10,000 parts per million by weight of the silicon-containing impurity.

6. A method as claimed in claim 1 and wherein the anhydrous cement contains at least 20 percent by weight of $Al_2O_3$.

7. A method as claimed in claim 6 and wherein the anhydrous cement contains from 70 percent to 95 percent by weight of a combination of $Al_2O_3$ plus CaO.

8. A method as claimed in claim 1 and wherein the cement comprises particles having a specific surface area of at least 1000 $cm^2.g^{-1}$.

9. A method as claimed in claim 1 and wherein the pH of the mixture is maintained between 6 and 10.5 during equilibration.

10. A method as claimed in claim 1 and wherein the temperature of the mixture is maintained between 20° C. and 80° C. during equilibration.

11. A method as claimed in claim 1 and wherein the silicon-containing impurity comprises colloidal silica or silicate particles.

12. A method as claimed in claim 1 and wherein the high alumina cement is mixed with the water and the mixture is allowed to equilibrate and there is present in the water during the equilibration an alkali metal cation or alkaline earth metal cation.

13. A method as claimed in claim 1 and wherein the high alumina cement is mixed with the water and the mixture is allowed to equilibrate and during the equilibration the mixture is forced to undergo turbulent motion.

* * * * *